June 2, 1931.  H. DREW  1,807,779
OVERGEAR SHIFT MECHANISM
Filed Aug. 25, 1927  2 Sheets-Sheet 1

June 2, 1931.  H. DREW  1,807,779

OVERGEAR SHIFT MECHANISM

Filed Aug. 25, 1927   2 Sheets-Sheet 2

Inventor
Harold Drew

By Blackmore, Spencer & Hulin
Attorneys

Patented June 2, 1931

1,807,779

UNITED STATES PATENT OFFICE

HAROLD DREW, OF LANSING, MICHIGAN, ASSIGNOR TO GENERAL MOTORS CORPORATION, OF DETROIT, MICHIGAN, A CORPORATION OF DELAWARE

OVERGEAR SHIFT MECHANISM

Application filed August 25, 1927. Serial No. 215,413.

This invention relates to transmission mechanism and more specifically to a gear shifting mechanism for a transmission having four forward speeds and a reverse. The design has been made with particular reference to the control of a four forward speed transmission for motor vehicles.

In the shift mechanism for the forward and reverse transmission it is usual to employ two shift forks, each movable to fore and aft positions. One shift fork effects a gear relation for reverse and low speed forward, the other for second and third forward speeds. The adoption of a fourth forward speed introduces a further problem in gear shifting which this invention aims to solve by mechanism which is operative in a manner not so different from the conventional as to confuse the operator of the car, and one which is comparatively simple and economical to manufacture. The design has been made to cooperate with the specific four forward speed transmission shown, described, and claimed in my application for overgear transmission, Ser. No. 210,839, filed August 5th, 1927, although it will be understood that the shift mechanism of this application is not restricted to use with the particular transmission of my other application.

The invention is illustrated in the accompanying drawings, wherein Figure 1 is a view in side elevation of the transmission housing, partly broken away to show the relation between the transmission gearing and the shift mechanism.

Figure 1:
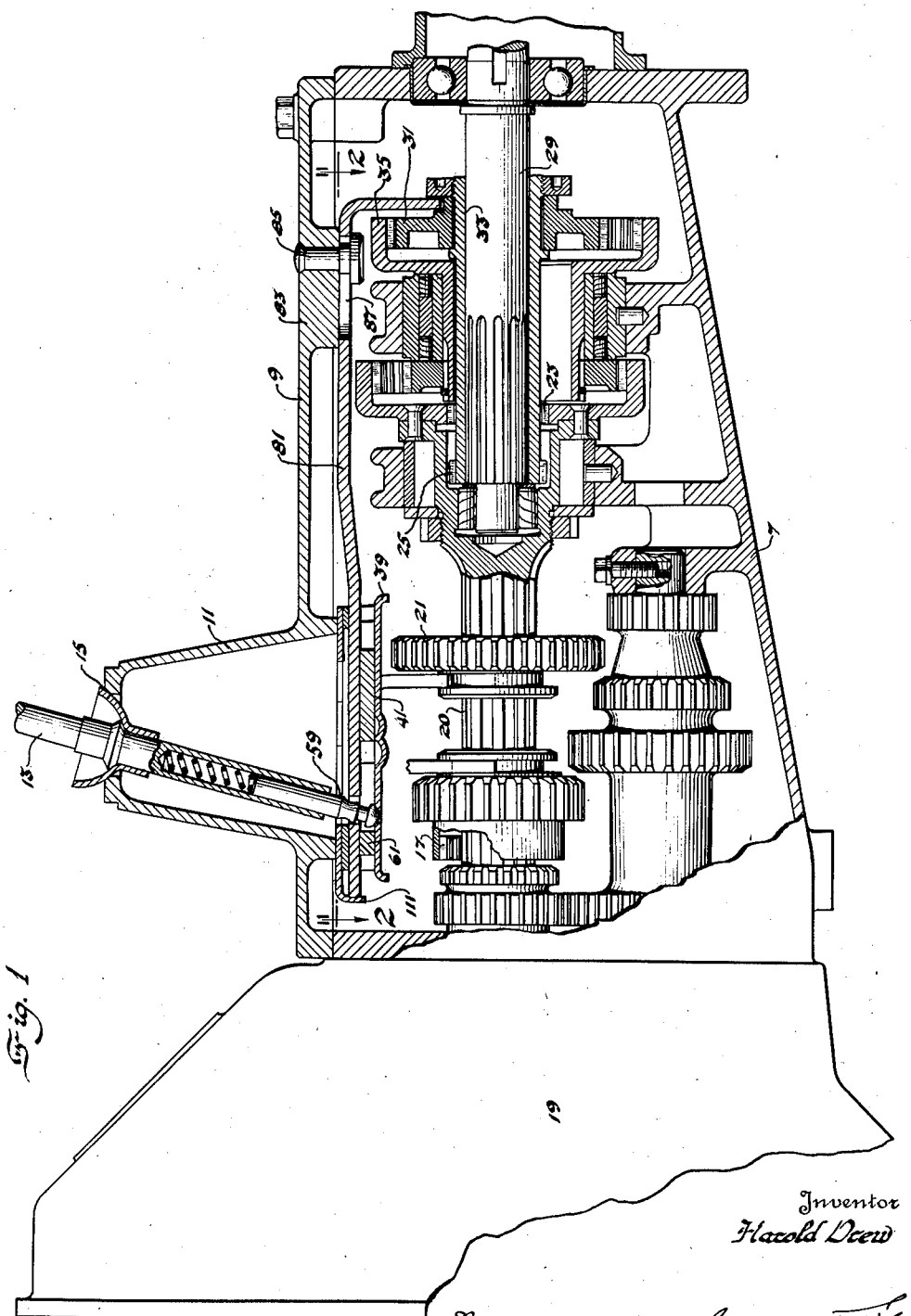

Referring by reference characters to the drawings, numeral 7 represents the transmission housing having a top wall 9 from which projects upwardly a dome 11. Within the dome is mounted a shift lever 13, there being a ball joint as at 15 to permit the lever to be shifted both longitudinally and transversely in the customary manner.

The gear elements constituting the transmission are not fully illustrated as this gearing is not a part of the invention for which this application seeks protection. For the purpose of showing the relation of the gearing to the shift mechanism there is illustrated a gear 17 which is moved forwardly to effect a direct clutch engagement between the driving shaft from the motor clutch within housing 19 and the transmission shaft 20 upon which said slidable gear 17 is movable. Such a clutched position of gear 17 may be designated third speed position. This gear 17 is also moved rearwardly from its neutral position to engage countershaft gearing whereby the vehicle is driven in second speed. Gear 21 is moved forwardly on shaft 20 to drive in low speed, and rearwardly from its neutral position to drive the vehicle in reverse. In these several driving positions there is direct connection involving the engagement of teeth 23 and 25 between the shaft 20 and the driven shaft 29 whereby shafts 20 and 29 are driven at the same speed. To secure the fourth speed gear 31 carried by sleeve 33, which sleeve carries the clutch teeth 25, the latter slidably splined to shaft 29 is moved forwardly. Such forward movement breaks the clutch engagement between teeth 23 and 25 and engages gear 31 with the internal teeth of gear 35, the latter being the part of a gear ring positioned eccentrically with reference to the aligned shafts and rotating at a speed above that of shaft 20. This gearing arrangement is more fully explained in the aforesaid companion application, only such parts being here described as are being necessary to show the relation between the gearing and the shift device.

Beneath the dome 11 is the assembly of fixed and movable members with which the lever 13 cooperates. This assembly includes a supporting plate 39 carried by the upper wall 9 of the gear housing beneath the dome portion 11. The supporting plate has a floor 41, vertically disposed side walls 43, and horizontal flanges 45, the latter provided with spaced openings 46 for fastening means 47.

At its ends the floor is turned downwardly as at 49 for stiffness. The floor is formed with two elongated openings 51 and 53. It also has transverse grooves 55 and 57 and a plurality of pockets a, b, c, d, e to receive the spring actuated detent 59 at the lower end of the lever 13 in the several positions of said lever. Slidable on the floor 41 are two shift members, 61 for second and third speeds and 63 for first speed and reverse. Shift member 63 is formed with a lever engaging recess 65 on its edge adjacent shift member 61. Just forward of recess 65 is a pin 67 extending upwardly from the shift member. The rear edge is formed with two rearwardly directed tongues 68 from between which the material of the plate is downwardly directed to form a gear collar engaging fork as at 69. Shift member 61 is of substantially the same external dimension as 63. It is formed with a longitudinal slot 71 communicating with a transverse slot 73, the latter in transverse alignment with the slot or recess 65 of plate 63 when said plates are in neutral position. Just to the rear of the transverse slot 73 is an upwardly directed pin 75. Beneath the shifter member 61 its fork 76 may be secured thereto preferably by welding. It will be understood that the forks 69 and 76 pass through openings 51 and 53 of the supporting plate when the shifter members are assembled on the floor of the supporting plate, the slots 51 and 53 having sufficient length to permit the necessary fore and aft movements of the shifter members and forks to make the necessary gear engagements.

Third shifter member 81 overlies shifter members 61 and 63. Just to the rear of the portion of shifter member 81 which overlies and engages the shifter members 61 and 63 it is upwardly bent as at 82. The shifter member 81 is continued rearwardly where it slidably engages the under surface of part 83 of the top of the housing, and a pin 85 projecting therefrom guides the shifter member 81 in its forward and backward movements by the provision of a slot 87. The extreme rear end of shifter 81 is downwardly directed and formed to engage and move the sleeve 33 and gear 31. The shift member 81 is formed with an elongated slot 91 wide enough for the passage of both pins 67 and 75 which project up through the said slot. It is also wide enough to permit the transverse movements of the lower end of the lever as it enters the slots 65 of shifter member 63 and 73 of shifter member 61. On the side of slot 91 adjacent shifter 61 is a transverse slot 95 communicating with the slot 91, and just to the rear of the transverse slot 95 is an upwardly projecting pin 97. The longitudinal wall of slot 91 adjacent pin 97 lies substantially along the inner longitudinal wall of slot 71 of shifter member 61.

Figure 3:
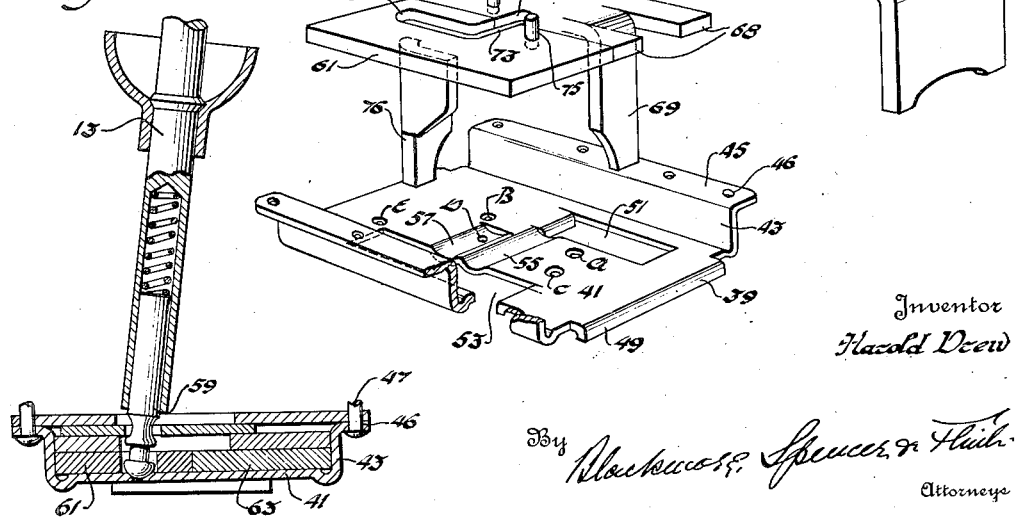
Figure 3 is a transverse section on line 3—3 of Figure 2.

Immediately beneath the lever carrying dome is a two-part top plate comprising parts 99 and 101. The rearward part 99 has a forwardly directed rectangular recess 103 and the forward part 101 has a rearwardly directed rectangular opening 105. The opening afforded by the combined openings 103 and 105 provides for the necessary movements of the lever 13 in making the several shifts. The spaces 107 and 109 between the two parts are for the guidance laterally of an interlocking device. At the forward end of top plate 101 there is a downwardly bent flange 111 to engage and limit the forward movement of the shifter member 81. The top plates are secured in position by the rivets 47 which are used to secure the flanges of the supporting plate to the housing as best shown in Figure 3.

Figure 5:
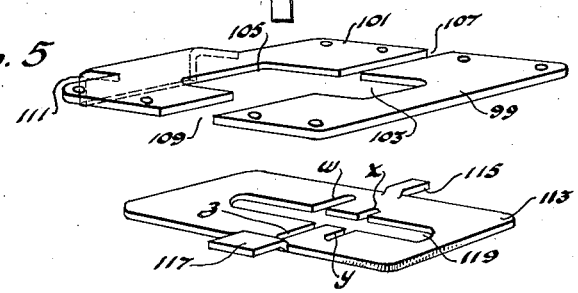
Figure 5 is a view showing the several parts of the gear shift mechanism in perspective and in dismantled relation.

Between the top plates and the upper shift plate 81 is what may be designated as an interlocking plate, the function of which is to prevent accidental movement of either of the other shifter members when one of the shifter members is being moved. This interlocking plate 113 has laterally and upwardly directed tongues 115 and 117. These tongues are dimensioned to move transversely in the spaces 107 and 109 as will be readily seen by an examination of Figure 2 and Figure 5. This plate 113 has a longitudinal slot 119, the slot having a transverse dimension just sufficient to accommodate the operating lever, as shown in Figure 3. The slot 119 clearly offers no restraint to the forward and backward movements of the lever, but any transverse movement of the lever carries the interlocking plate with it. Transversely extending slots x, y, z, w extend from the longitudinal slot, these transverse slots being positioned to receive at times the pins 67, 75 and 97 of the shifter members in a way to be explained.

The operation of the gear shifting mechanism is as follows. Let it be assumed that the mechanism is in its neutral position. The shifting members 61 and 63 are in the relative position shown by Figure 5 (not as in Figure 2) with the transverse slots 73 and 65 in registration. Pins 67 and 75 pass through the wide slot 91 of shifter member 81 and being positioned so that they may enter slots w and y. Shifter member 81 is rearwardly of the position shown by Figure 2 so that the clutch (not the gear 31) is in driving engagement, its pin 97 is in slot z. The shift lever 13 may be moved laterally, the detent 59 at its lower end moving in groove 55. In this movement the interlocking plate moves transversely with the lever as heretofore explained. Pin 67 may move into and out of slot w and pin 75 may move into and out of slot y during such transverse movements. The pin 97 of plate 81 is simultaneously moving along slot z but does not move out of said slot. To shift into reverse the lever is transversely moved to engage slot 65. In so doing pin 67 escapes from slot $w$ and enters the longitudinal slot 119, thus freeing the shifter member 63 for longitudinal movement by the lever 13. At the same time pin 75 engages in slot $y$ and locks shifter 61 from longitudinal movement. Shift member 81 is still held by its pin 97 in slot $z$ as explained. A forward movement of the knob end of the lever 13 moves the lower end of said lever out of grooves 55 to a position at $a$. Shifter 63 has been so moved to effect the gear engagement for reverse drive. To drive forwardly at low speed the lever is returned to its mid-position as before. Its knob is drawn backwardly until the lower end moves to the point $b$ in which position the gears are engaged for driving at low speed.

Figure 2:
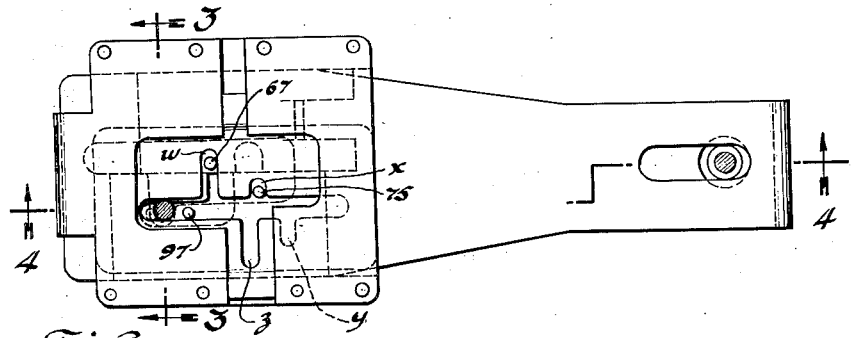
Figure 2 is a horizontal section substantially on the line 2—2 of Figure 1.
Figure 4:
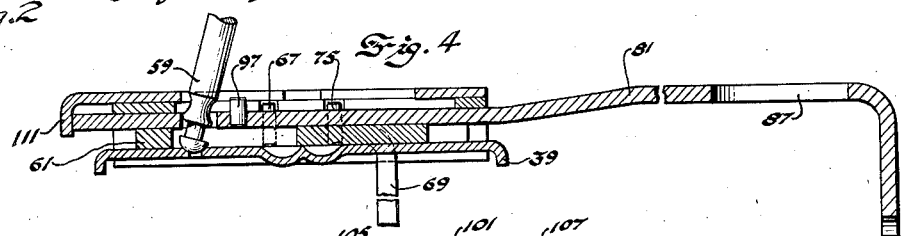
Figure 4 is a longitudinal section on line 4—4 of Figure 2.

To drive in second speed the lever is shifted transversely, its lower end moving in slot 55, the interlocking plate serving to lock from movement shifter member 63 and to free for movement shifter member 61 as will be understood from the discussion above. To drive in second speed the lower end of the lever enters depression $c$ and to drive in third speed the lower end of the lever enters depression $d$. In these movements of the lever to effect second and third speeds it should be observed that the lower end of the lever is kept from moving into slot 71 from slot 73 by its engagement with the wall of slot 91 of the shift member 81 as shown in Figure 2. When the shift member has been moved to third speed position, however, its slot 73 is in transverse alignment with slot 95 of the shifter member 81 in the then locked position of said last mentioned shift member. Should it be desired to shift into fourth speed the lever 13 is moved laterally so that its lower end moves in groove 57. The pin 97 then escapes from slot $z$ into the longitudinal slot 119 whereby the shift member 81 is free to be moved longitudinally by the lever. In this extreme lateral movement of the lever the interlocking plate has been moved to an extreme lateral position also, this position being illustrated in Figure 2. When in this extreme transverse position it will be seen that the pin 75 has moved from slot 119 into slot $x$ and pin 67 has been moved further into slot $w$. The longitudinal slot 71 of plate 61 is provided to permit the longitudinal movement of plate 81 as will be understood from an examination of the drawings. A further rearward movement at the knob end of the lever will then move the lower end of the lever into depression $e$ and produce the arrangement of parts illustrated in Figure 1 and Figure 2 wherein the fourth and highest speed ratio is obtained from the transmission gearing.

The parts are made by a stamping process and are therefore economical to manufacture. They are easily assembled. The arrangement employs conventional shifting so as not to confuse an operator familiar with the usual three speed transmission mechanism.

As before stated, although intended primarily for a particular transmission the gear shifting device is useful with other transmissions wherein a third shifter member is required.

I claim:

1. Change speed mechanism comprising two shift members positioned in one plane and a third shift member positioned in a parallel plane, means to engage and shift said shift members, said third shift member having an opening through which said means passes to engage one or the other of the two first-mentioned shift members.

2. Change speed mechanism comprising a first shift member, a second shift member, both shifting members positioned in one plane, a superposed third shifting member, each of said two first mentioned shift members having a transverse slot for engagement with a shift lever, said third shift member having an opening for the passage of the shift lever, said opening being transversely dimensioned to permit the engagement of the lever with the transverse slots of each of said two first mentioned shift members.

3. The invention defined by claim 2, said opening of the third shift member being elongated to permit forward and backward shifting movements of said lever effective upon said two first mentioned shift members.

4. The invention defined by claim 2, said opening of the third shift member being elongated to permit shifting movements of said first mentioned two shift members, said second shift member having a longitudinal slot communicating with its transverse slot, and the third shift member having a transverse slot positioned to lie at times in transverse extension of the transverse slot of the second shift member.

5. In a transmission mechanism, two shift members having transverse slots on their adjacent edges which are in alignment in the neutral position of said shift members, each of said shift members mounted for forward and rearward movement to active positions, the second of said shift members having a longitudinal slot communicating with its transverse slot, a superposed shift member having an opening, a lever passing through said opening and engageable with the transverse slots of said first and second shift members, said opening being longitudinally and transversely dimensioned to permit lever movements for shifting, its transverse dimension being such that the lever is normally kept from entering the longitudinal slot of the second shift member, means associated with said superposed shift member whereby said lever may move said superposed shift member, the longitudinal slot of the second shift member accommodating said movement.

6. The invention defined by claim 5, said third shift member having a transverse slot which overlies the transverse slot of the second shift member when the latter is in one of its active positions whereby the lever may actuate the third shift member, the longitudinal slot of the second shift member permitting the said second shift member to remain in its active position when the third shift member is moved to its second position.

7. In a change speed mechanism, a lever, a pair of shift members in one plane, a superposed shift member, said shift members constructed to cooperate with the lever, an interlocking member movable transversely with the lever but held from forward and rearward movements, means on each of said shift members cooperating with said interlocking member to prevent the movements of all but one of said shift members at any one time by said lever.

8. In a change speed device, two shift members, a single superposed shift member, said shift members having transverse slots, a lever to engage in said slots to move said shift members individually, pins on said shift members, an interlocking plate having slots to engage said pins, said interlocking plate movable to a plurality of transverse positions with said lever to admit in any one of said positions into its slots all but one of said pins.

9. The invention defined by claim 8, one or more of said interlocking plate slots being of sufficient length to admit its pin to a plurality of different depths in the slot to correspond with different degrees of transverse adjustment of the interlocking plate.

10. In a change speed mechanism, longitudinally movable shift members, a superposed interlocking member, a shift lever, said interlocking member having a longitudinal slot for the passage of said lever, pins on said shift members, said interlocking member having transverse slots to engage said pins, two of said slots cooperating with one of said pins in two positions of transverse adjustment of said interlocking plate.

11. The invention defined by claim 10, one of said two last mentioned slots being on each side of the longitudinal slot.

12. The invention defined by claim 10, one of said two last mentioned slots being on each side of the longitudinal slot and each of the other transverse slots of the interlocking plate being of greater length than the two first mentioned slots, the pin and slot arrangement accommodating a plurality of transverse positions of adjustment of said interlocking member.

13. In a change speed device for vehicles, a first movable member, a second movable member, and a third movable member longitudinally spaced from said first and second movable members, a shift lever, a plurality of shift members operated by said lever, one shift member for each of said movable members, the shift member associated with the third movable member being relatively long overlying the other shift members and apertured for the passage of said lever.

14. In a gear shift mechanism, a pair of juxtaposed shift members having longitudinally offset abutment surfaces and an operating member intersecting both of said shift members at all times during its operation thereof and adapted to engage sucessively said abutment surfaces to produce a sequential shift, the member first engaged having a void in the zone of travel of the abutment surface of the member last engaged.

15. Shifting mechanism for change speed gearing comprising two juxtaposed shift members operably connected with the change speed gearing and an operating member cocooperatively associated with said shift members and intersecting said shift members during its entire cooperative association therewith, each of said shift members having means adapted to be engaged successively by the operating member to effect a sequential movement of said shift members to and from inactive and active positions and each of said shift members having a void in the zone of travel of said operating member during its movement of the other shift member.

16. Shifting mechanism for change speed gearing comprising two juxtaposed shift members operably connected with the change speed gearing and an operating member permanently interesecting a surface plane of each shift member, one portion of one shift member having means adapted to be engaged by said operating member by initial movement thereof for effecting movement of said one shift member, the second shift member having means adapted to be engaged by said operating member by progressive movement thereof beyond said initial movement for effecting sequential movement of said second shift member and another portion of said one shift member having a void in the zone of travel of the operating member during its movement of said second shift member.

17. A gear shift mechanism comprising three juxtaposed shift members operably connected with the gear shift mechanism and each having an abutment surface and an operating member adapted to have cooperative association at all times with two of said shift members and intersecting said two shift members during its entire cooperative association, therewith, said operating member being adapted to engage successively the abutment surfaces of said two shift members to effect sequential shift thereof to and from inactive and active positions, the member first engaged having a void in the zone of travel of the abutment surface of the member first engaged, and said operating member being adapted to engage selectively from neutral position the abutment surface of the third shift member or the abutment surface of one of said two shift members.

18. In a gear shift mechanism, a pair of juxtaposed shift members having abutment surfaces, an operating member intersecting both of said shift members during its entire operation thereof and adapted to engage successively said abutment surfaces to produce a sequential shift, the member first engaged having a void in the zone of travel of the abutment surface of the member first engaged, and means adapted to have locking engagement with one shift member for preventing movement thereof during the shifting of the other shift member.

19. In a gear shift mechanism, a pair of shifting members having abutment surfaces, an operating member adapted to engage successively said abutment surfaces to produce a sequential shift of said shifting members, a movable locking member directly controlled by movement of said operating member, and means on said shift members adapted to have interlocking engagement with said locking member whereby each shift member is prevented from shifting during shifting of the other shifting member.

20. A pair of shift members, means for sequentially engaging and shifting said members and means directly controlled by the shifting means for locking the member not engaged.

21. In a gear shift mechanism, three shift members, operating means for sequentially engaging and shifting two of said shift members and for selectively engaging and shifting the third shift member or one of said two shift members, and a locking member directly controlled by said operating means, said shift members and locking member having interengageable means for locking the shift members not engaged by the operating means.

In testimony whereof I affix my signature.

HAROLD DREW.